United States Patent
Boston et al.

(10) Patent No.: US 9,068,574 B2
(45) Date of Patent: Jun. 30, 2015

(54) ASSEMBLY HAVING A CONTROL DEVICE WITH RACKS FOR CONTROLLING THE ANGULAR POSITION OF PIVOTALLY-MOUNTED BLADES IN A TURBINE ENGINE

(75) Inventors: Eric Jacques Boston, Cesson (FR); Michel Andre Bouru, Montereau sur le Jard (FR); Laurent Jablonski, Melun (FR); Philippe Gerard Edmond Joly, Vaux le Penil (FR)

(73) Assignee: SNECMA, Paris (FR)

( * ) Notice: Subject to any disclaimer, the term of this patent is extended or adjusted under 35 U.S.C. 154(b) by 500 days.

(21) Appl. No.: 13/578,765

(22) PCT Filed: Feb. 7, 2011

(86) PCT No.: PCT/FR2011/050236
§ 371 (c)(1),
(2), (4) Date: Sep. 12, 2012

(87) PCT Pub. No.: WO2011/098712
PCT Pub. Date: Aug. 18, 2011

(65) Prior Publication Data
US 2013/0011261 A1 Jan. 10, 2013

(30) Foreign Application Priority Data
Feb. 12, 2010 (FR) ...................................... 10 00582

(51) Int. Cl.
*F04D 29/36* (2006.01)
*F03D 7/02* (2006.01)
(Continued)

(52) U.S. Cl.
CPC .......... *F04D 29/362* (2013.01); *F05D 2260/74* (2013.01); *F03D 7/0224* (2013.01);
(Continued)

(58) Field of Classification Search
CPC ..... F04D 29/323; F04D 29/36; F04D 29/326; F05D 2260/74; F05D 2260/75; F05D 2260/76; B64C 11/06; B64C 11/30; B64C 11/32; B64C 11/34; F03D 7/0224; F03D 7/024; B63H 3/002
USPC .................................................. 416/155, 205
See application file for complete search history.

(56) References Cited

U.S. PATENT DOCUMENTS 3,422,625 A * 1/1969 Harris .............................. 60/268
3,876,334 A 4/1975 Andrews
(Continued)

OTHER PUBLICATIONS

International Search Report Issued May 30, 2011 in PCT/FR11/50236 Filed Feb. 7, 2011.

*Primary Examiner* — Ninh H Nguyen
(74) *Attorney, Agent, or Firm* — Oblon, McClelland, Maier & Neustadt, L.L.P.

(57) ABSTRACT

An assembly in a turbine engine for controlling plural toothed pivotally-mounted blades arranged in azimuth around the axis of the turbine engine and including an actuator ring controlling a position of the blades. Racks mounted on the ring present corresponding sets of teeth meshing with the set of teeth of a respective one of the blades to place it in a selected angular position, and they are held in the radial direction by radial positioning mechanism fastened to the blade. Each rack is mounted on the ring by plural guides spaced apart circumferentially around the ring, that connect together movements of the rack and of the ring in the circumferential direction, and that are configured to slide relative to the ring, for each guide in its own radial direction, and relative to the rack in a direction of movement that is substantially radial and specific to the rack.

14 Claims, 4 Drawing Sheets

(51) Int. Cl.
  *B63H 3/00* (2006.01)
  *B64C 11/32* (2006.01)
  *B64C 11/48* (2006.01)
  *B64D 27/02* (2006.01)

(52) U.S. Cl.
  CPC ............... *B63H 3/002* (2013.01); *B64C 11/32* (2013.01); *B64C 11/48* (2013.01); *B64D 2027/026* (2013.01); *F04D 29/36* (2013.01)

(56) References Cited

U.S. PATENT DOCUMENTS

| | | | |
|---|---|---|---|
| 3,893,789 A | | 7/1975 | Andrews |
| 4,657,484 A | | 4/1987 | Wakeman et al. |
| 4,968,217 A | * | 11/1990 | Newton ........................ 416/160 |
| 5,152,668 A | * | 10/1992 | Bulman et al. ................ 416/129 |
| 5,174,716 A | | 12/1992 | Hora et al. |
| 5,282,719 A | * | 2/1994 | McCarty et al. .................. 416/1 |

* cited by examiner

1

ASSEMBLY HAVING A CONTROL DEVICE WITH RACKS FOR CONTROLLING THE ANGULAR POSITION OF PIVOTALLY-MOUNTED BLADES IN A TURBINE ENGINE

The invention relates to an assembly comprising an actuator ring, a plurality of pivotally-mounted blades distributed in azimuth around a first axis, and a control device for controlling the angular position of said pivotally-mounted blades.

In a known embodiment in a turbine engine, a pivotally-mounted blade stage may be controlled by using an actuator ring. When the ring turns about the axis of the turbine engine relative to the structure of the rotor that supports the blades, the turning causes the blades to pivot so as to take up a desired angular position. A control device of that kind is disclosed by patent application EP 1 953 084.

The invention relates more particularly to an assembly fitted to a turbine engine having blades that are required to rotate at a high speed of rotation (e.g. 1000 revolutions per minute, or even more), and/or to operate at high temperature.

In another known embodiment, a device for controlling pivotally-mounted blades of a turbine engine transmits the angular position command to the blades via bevel gears that are arranged inside a polygonal ring supporting the blades. Nevertheless, for reasons of lack of space it can be difficult, if not impossible, to control all of the blades from inside the ring.

An object of the invention is thus to propose an assembly comprising an actuator ring, a plurality of pivotally-mounted blades distributed in azimuth around a first axis, and a control device for controlling said plurality of pivotally-mounted blades by means of an actuator ring, each of said blades presenting a set of teeth; in which assembly the blade control device is suitable for controlling the angular position of the pivotally-mounted blades in reliable manner, occupies a volume that is relatively small, in particular being located upstream from the polygonal ring (or equivalent means) supporting the blades, and finally is suitable for operating over a wide range of temperatures and/or at high speeds of rotation.

This object is achieved by the facts that:
said assembly includes racks mounted on the ring;
each rack meshes with the set of teeth of one of the blades in order to place the blade in a selected angular position;
each rack is held in the radial direction by radial positioning means fastened to the blade; and
each rack is mounted on the ring by means of a plurality of guides spaced around the circumference of the ring, linking movements of the rack in the circumferential direction to movements of the ring, and suitable for sliding firstly relative to the ring along the radial direction specific to each guide, and secondly relative to the rack along a movement direction that is substantially radial and specific to the rack.

Above, the term "in azimuth" means "in a plane perpendicular to the axis under consideration", i.e. in the present situation a plane perpendicular to the first axis (which corresponds to the axis of the turbine engine when the invention is incorporated in a turbine engine). The pivotally-mounted blades of angular position that is controlled by the control device of the invention may optionally be distributed angularly in regular manner around the axis of the turbine engine.

The invention may be embodied in various ways.

In one embodiment, all of the blades arranged in azimuth and forming a blade wheel are driven and controlled angularly by the actuator ring. The ring is itself driven by means for controlling the actuator ring, e.g. an actuator controlled by an electronic control unit.

Furthermore, as mentioned above, an object of the invention may consist in particular in enabling the pivoting of the blades to be controlled, even when the inside space relative to the blades is insufficient to enable all of them to be controlled using bevel gears arranged inside the polygonal ring supporting the blades.

Under such circumstances, in one embodiment, some of the blades are driven by gears or equivalent means situated inside the blade support ring. Those blades are referred to as "driving" blades insofar as they in turn drive the remainder of the blades, which are referred to as "driven" blades.

Thus, in the first or "driving" group of blades, which group includes at least one blade and for example comprises half of the blades (every other blade), the angular position of the blades is controlled angularly by first control means, e.g. by gears situated inside the blade support ring. The remainder of the blades, i.e. those blades that are not controlled by the first control means, constitute the second or "driven" group of blades. The angular position of the driven blades is controlled by the control device of an assembly of the invention.

Under such circumstances, for all of the driving blades, the control device includes coupling means between the driving blades and the actuator ring. The coupling means ensure that each time the angular position of the driving blades is changed, the change drives corresponding turning of the actuator ring.

Advantageously, the coupling means may comprise racks identical to those fitted to the blades of the second group of blades, and meshing with corresponding sets of teeth on the driving blades. Because all of the racks are linked to the drive ring, it follows that the movement in the circumferential direction that is imparted to the actuator ring is common to all of the racks and is therefore transmitted to all of the blades. Under such circumstances, the actuator ring is a synchronizing ring that synchronizes the pivoting movements of all of the blades of the bladed wheel.

The structure and the operation of the assembly of the invention are described in greater detail below.

A first characteristic of the invention consists in the fact that each pivoting blade is actuated by means of a set of teeth that meshes with a corresponding set of teeth of a rack.

Furthermore, the racks are mounted on the actuator ring by means of guides. The guides are parts or sets of parts that provide linking between the actuator ring and the rack. In particular, the guides constrain the ring and the rack to move together in turning so that any turning of the actuator ring relative to the structure of the rotor is transmitted to the rack (a very small error remaining possible as a result of the ability of the guides to slide relative to the rack). Consequently, the angular position of the actuator ring about the axis of rotation of the turbine engine imparts an angular position to the blades via the racks because of the mutual meshing between the sets of teeth on the racks and the sets of teeth on the blades.

The set of teeth on a blade may be formed directly on the blade or it may be formed on a part that is fastened to the blade.

It should also be observed that stating that the rack is mounted on the ring covers a rack mounted on any surface of the ring, regardless of whether it is a radially outer surface (the preferred solution, since problems of lack of space are reduced), an edge face surface of the rack having its normal approximately parallel to the axis of rotation of the turbine engine, or indeed a radially inner surface of the actuator ring.

The most advantageous characteristic of the invention lies in the connection between the racks and the actuator ring. While devising the invention, it was found that the rack cannot be fixed relative to the actuator ring and cannot form part of it. On the contrary, it is essential to leave a possibility for relative radial movement between the rack and the ring in order to ensure that the device for controlling the angular position of the blades operates reliably.

This need to provide the rack with a degree of freedom relative to the actuator ring is due mainly for two reasons:

I. Overall Expansion

As mentioned above, the assemblies of the invention include in particular control devices (in particular on board an aircraft) for controlling pivotally-mounted blades that can reach high speeds of rotation and/or can be subjected to high temperatures. In operation, such devices are therefore subjected both to centrifugal forces associated with the rotation of the rotor of the turbine engine and/or also to large temperature variations that give rise to expansions of the various parts involved.

Thermal expansions and centrifugal forces produce the same effect on the actuator ring, i.e. overall expansion thereof. This overall expansion occurs both in the radial direction and in the circumferential direction (the direction tangential to the circumference of the ring and perpendicular to the axis of rotation). The circumferential expansion to which the actuator ring is subjected naturally gives rise to an increase in all distances in the circumferential direction on the actuator ring.

If the actuator ring had its own set of teeth, designed to mesh in a corresponding set of teeth on a blade, it will be understood that the pitch of the teeth on the ring would tend to increase with increasing speed of rotation of the rotor, as a result of the overall expansion of the actuator ring caused by centrifugal forces (and likewise by a rise in temperature).

Conversely, during the same rotation, the pitch of the teeth on the pivotally-mounted blade is not subjected to any increase, even though said set of teeth extends in the circumferential direction.

Furthermore, reliable operation of the control device requires very accurate meshing of the teeth on the actuator ring with the corresponding teeth on the blade. It is therefore essential for both sets of teeth to have exactly the same pitch. Consequently, an increase in the pitch of the teeth on the actuator ring is unacceptable when the teeth on the pivotally-mounted blade retain a pitch that is constant.

That is why, in the control device in an assembly of the invention, angular movements of the ring relative to the structure of the rotor are not transmitted to the blade directly from teeth on the ring, but are transmitted via racks that are mounted on the ring in the manner specified above.

Advantageously, the way the racks are mounted on the ring allows the pitch of the teeth on the racks to remain constant, even at high speeds of rotation of the rotor or in the event of large temperature variations.

While the rotor is rotating rapidly, each individual segment is naturally subjected to centrifugal forces. However, since the racks are parts that are distinct from one another, i.e. that are not connected to one another but only to the ring, centrifugal forces themselves give rise to practically no elongation of the racks in the circumferential direction.

Nevertheless, the racks may be subjected to elongation by traction in the circumferential direction as imparted by the guides on the racks.

The possibility of such circumferential traction existing stems from the fact that the mounting of a segment on the ring requires at least two connection points between the rack and the ring, which points need to be spaced apart in the circumferential direction.

This need to have two connection points that are spaced apart circumferentially is due to the magnitude of the forces that act on the teeth of the racks and the blades. These forces are large in order to ensure reliable mutual meshing between the teeth on the racks and the blades. Because the sets of teeth on the racks extend over a certain length in the circumferential direction, it is necessary to provide each rack with a plurality of fastening points on the ring that are spaced apart in the circumferential direction, e.g. spaced apart by half the (circumferential) length of the rack. If the guides are spaced apart in this way along the rack, the forces applied by the blade to the rack are transmitted to the ring without giving rise to an excessive concentration of forces, thereby enabling the relative position between the rack and the blade to be maintained accurately.

In general, an arrangement with two guides per rack suffices to achieve this result. It serves to ensure that the rack does not pivot at all in spite of large forces being transmitted to the blade. With such an arrangement, the size, the cost, and the weight of the fastener means connecting the rack to the actuator ring are advantageously minimized.

As mentioned above, it might be feared that the existence of a plurality of connection points between the rack and the ring would lead to circumferential traction forces being applied to the rack by the guides. Under the effect of increases in temperature and/or of circumferential forces due to the rotor rotating, and as mentioned above, the ring is subjected to overall expansion leading to points on the ring being moved apart from one another, with this applying in particular to the points where the racks are mounted to the ring. It can be understood that such deformation may lead to the racks being lengthened since the guides link the racks to the ring in the circumferential direction.

However, according to the invention, the connection between the racks and the ring is such that the lengthening of the ring in the circumferential direction as a result of its overall expansion is not communicated to the racks, and as a result no circumferential stress is transmitted to the racks by the ring via the guides. Because the guides are suitable for sliding relative to the ring, when the ring is subjected to overall expansion, the guides remain in fixed positions relative to the blade, independently of the radial expansion of the ring. As a result this radial expansion (or contraction) of the ring does not give rise to any change in the pitch of the teeth on the racks.

II. Centrifugal Forces Applied to the Blades

The second reason that makes it necessary for the rack to present a degree of freedom relative to the actuator ring is the deformation to which the structure of the rotor is subjected during rotation. This deformation occurs at the pivot points of the blades, which points move radially under the effect of the traction exerted by the blades as a result of the considerable centrifugal forces acting thereon.

Conversely, since the actuator ring is generally in the form of a body of revolution, it is not subjected to such deformation.

For each blade, the difference in radial movement between the blade pivot and the actuator ring gives rise to a radial movement between the blade pivot and the ring. Nevertheless, the sets of teeth respectively on the rack and on the blade must, at all times, remain in register with each other, in particular in the radial direction, in order to be capable of performing their function in reliable and durable manner.

Advantageously, the control device of an assembly of the invention thus makes provision for the radial position of the rack to be determined by the radial position of the blade pivot.

This is achieved by means for linking the radial position of each rack with the radial position of the corresponding blade. These means are fastened to the blade, which is the simplest solution for enabling the rack to move radially by an amount that is equal at all times to the movement of the blade pivot.

In contrast, it follows that the radial position of the rack must be decoupled from that of the actuator ring. This decoupling is made possible by the fact that the guides are capable of sliding relative to the rack. This sliding enables the rack to move in translation relative to the guides in a direction that is substantially radial, and referred to as the direction of movement.

It should also be observed that in general, the means for mounting a rack on the actuator ring fix five of the six potential degrees of freedom of movement of the rack relative to the ring, with only movement in the substantially radial direction remaining possible.

In an embodiment, the direction of movement of each rack is parallel to the axis of the blade. The blade in question is naturally the blade having its teeth meshing with the rack. The above-mentioned deformation of the structure of the rotor results from forces transmitted by the blades. These forces act on the structure of the rotor at the locations of the blade pivots in the radial directions at those points. Thus, the direction of movement, which is the direction in which the racks must move in order to accompany the deformation of the structure of the rotor, is preferably parallel to the direction of the axis of the blade associated with the rack.

In an embodiment, at least one of the guides includes a ring guide rod engaged slidably in a ring guide passage formed in the ring in a direction that is radial for the guide.

The term "a direction that is radial to the guide" is used herein to mean a direction that is radial relative to the axis of the turbine engine at the location of the guide, e.g. the radial direction at the center of gravity of the guide.

The ring guide rod is a section-member bar that makes it particularly simple to accommodate radial movement of the actuator ring relative to the guide, and thus relative to the rack, without generating circumferential stress on the rack. It may be of circular section, however, more generally, it could be of any section.

In an embodiment, at least one of said guides includes a segment guide rod engaged slidably in a segment guide passage arranged in the movement direction of the rack under consideration.

The segment guide rod is a section-member bar that makes it very simple to enable the guide to perform its function of guiding the rack, while allowing it to move in the movement direction.

The segment guide rod may be circular in section, but more generally it may be of any section. A guide may for example comprise a plurality of parallel bars for guiding the rack.

When a guide has both a segment guide rod and a ring guide rod, a non-zero angle is (nearly always) formed between the segment and ring guide rods. The angle is the angle formed between the direction of movement (relative to the rack) and the radial direction for the guide. This angle is generally small, e.g. less than 10°.

In an embodiment, in which the guide has both a ring guide rod and a segment guide rod, the guide is a part constituted by the ring guide rod, the segment guide rod, and a junction portion connecting together the ring and segment guide rods. In general, this is a single part, however it could equally well be an assembly of parts. The junction portion may in particular be a junction slab interconnecting the ring and segment guide rods.

The junction portion may in particular include a function of preventing the guide from turning relative to the ring, in particular in order to keep the guides in a desired position, even in the absence of a rack. Thus, in an embodiment, the control device includes turn-blocking means arranged on the ring and suitable for preventing a first guide from turning relative to the ring about a radial direction. These means may be incorporated in the actuator ring or they may be fastened thereto. The means for preventing turning may make it easier to mount the rack on the actuator ring.

In a variant of the preceding embodiment, the first guide has a flat perpendicular to the axis of the turbine engine and the ring presents a plane surface arranged in the proximity of said flat so as to prevent the guide from turning about a radial direction. In particular, for a guide having a ring guide rod and a segment guide rod that are connected together by a junction portion, turning may be prevented by using side surfaces of the junction portion arranged to be perpendicular to the axial direction of the turbine engine.

In an embodiment, the control device includes at least one guide bearing such as a ball cage arranged in one of said passages to ensure that the rod extending in said passage slides therein. Such a guide bearing is used in particular for minimizing the friction forces transmitted between the actuator ring and the rack, with this being desirable in order to optimize positioning of the racks relative to the ring, thereby improving the operation of the control device.

In order to contribute to increasing the lifetime of the control device, in one embodiment the control device further includes a damper system in radial abutment against said bearing.

In an embodiment, the radial positioning means for each blade comprise a circularly arcuate rib about a radial axis arranged in an attachment-and-pivot device for the blade, and engaged in a groove in the rack meshing with the blade in order to impose a radial position on said rack (i.e. in such a manner that the rib imparts a radial position to the rack meshing with the blade).

The blade attachment-and-pivot device is a part or an assembly of parts situated at the end of the blade located beside the blade pivot and providing the connection between the airfoil portion of the blade and the structure of the rotor. The rib secured to the base of the blade is circularly arcuate in shape about the same axis as the pivot axis of the blade, thereby ensuring that its interaction with the rack is not modified regardless of the angular position occupied by the blade. The rib transmits a force to the rack in a radial direction, thereby imparting a radial position on the rack.

The invention also provides a turbine engine including an assembly having an actuator ring, a plurality of pivotally-mounted blades distributed in azimuth around the axis of the turbine engine, and a control device for controlling the angular position of said pivotally-mounted blades; each of said blades presents a set of teeth; in which turbine engine the control device is suitable for operating even if said blades are subjected to large temperature variations and/or are driven at a high speed of rotation.

This object is achieved by the fact that the assembly included in the turbine engine is an assembly as defined above.

Advantageously, the invention may be implemented in a turbine engine in which the blades controlled by the control device are blades having radially outer ends that are free. The invention thus relates in particular to turboprops.

The invention can be well understood and its advantages appear better on reading the following detailed description of an embodiment given by way of non-limiting example. The description refers to the accompanying drawings, in which.

Figure 2:
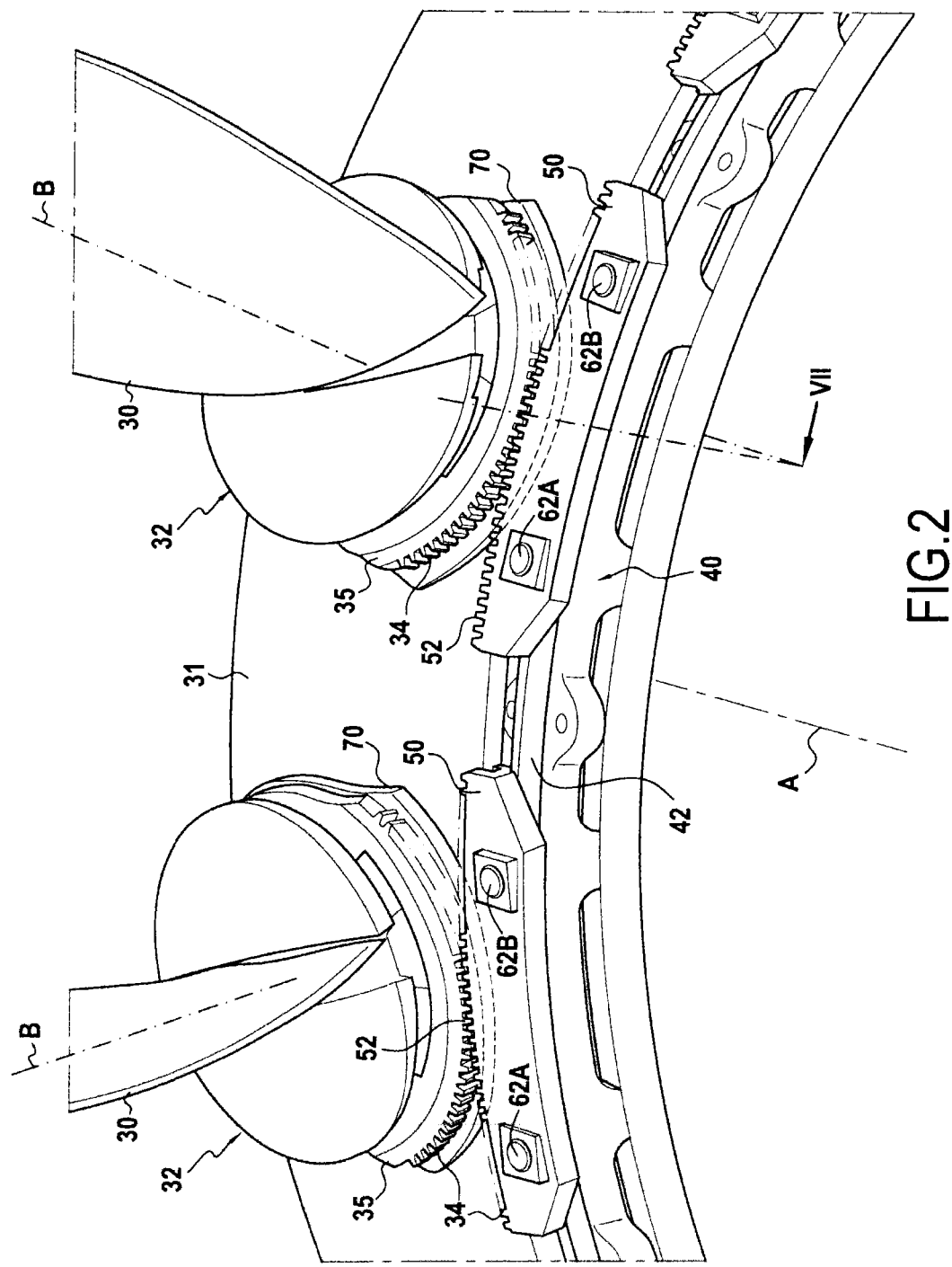
FIG. 2 is a fragmentary diagrammatic view of the control device for an assembly of the invention.
Figure 4:
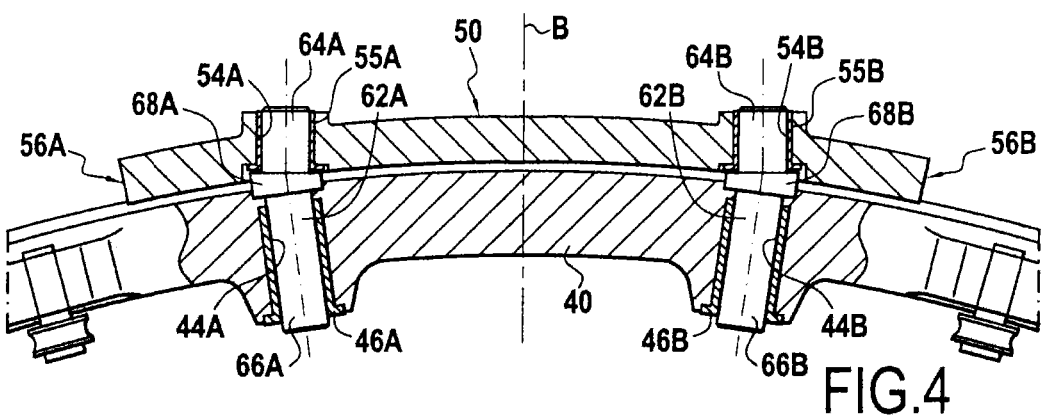
Figure 5:
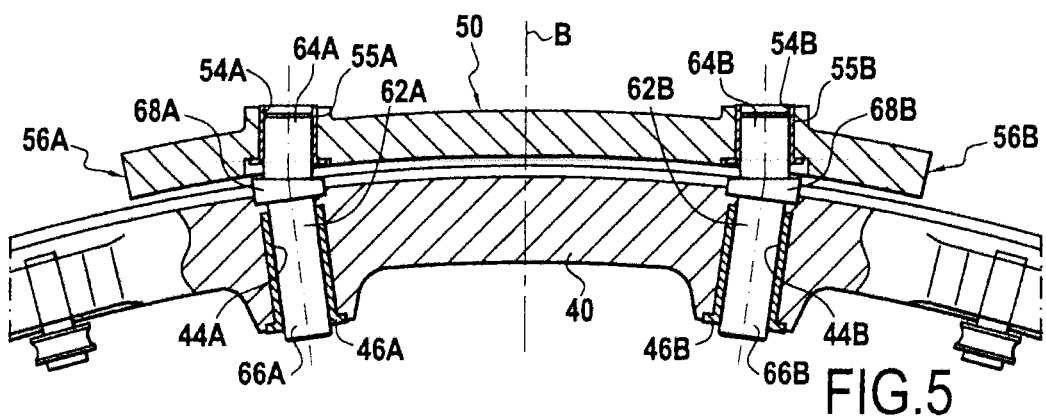
Figure 6:
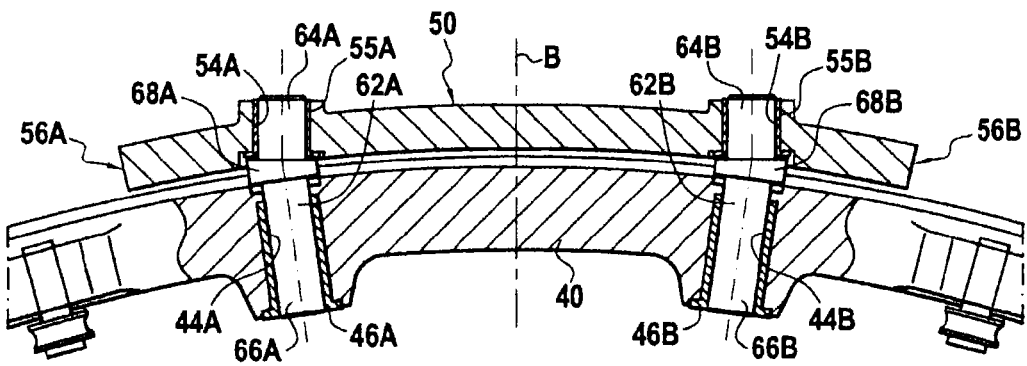
Figure 7:
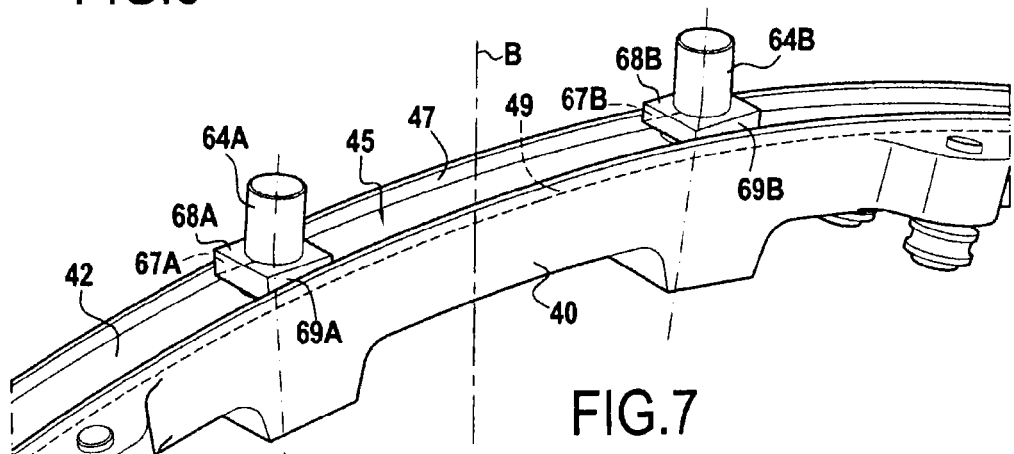
Figure 8:
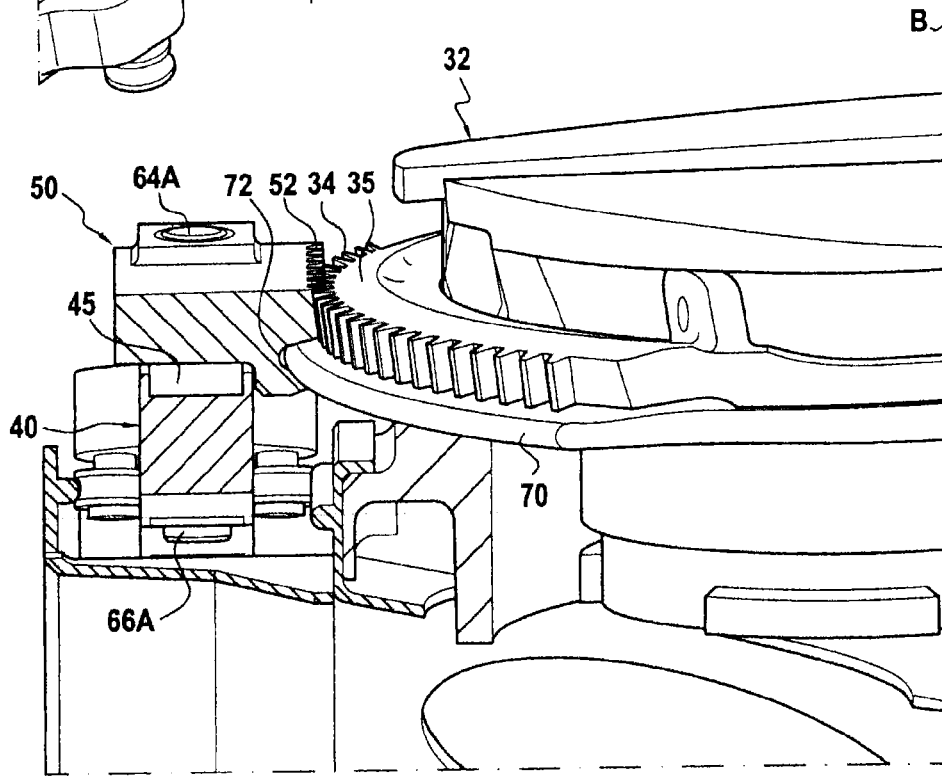

FIGS. 4, 5, and 6 are sections on the axis of rotation of the FIG. 2 control device, respectively when operating at moderate speed, at high speed, and when stationary;

FIG. 7 is a fragmentary diagrammatic perspective view of the actuator ring of the FIG. 2 control device, with two guides; and FIG. 8 is a fragmentary diagrammatic perspective view of the FIG. 2 control device.

Figure 1:
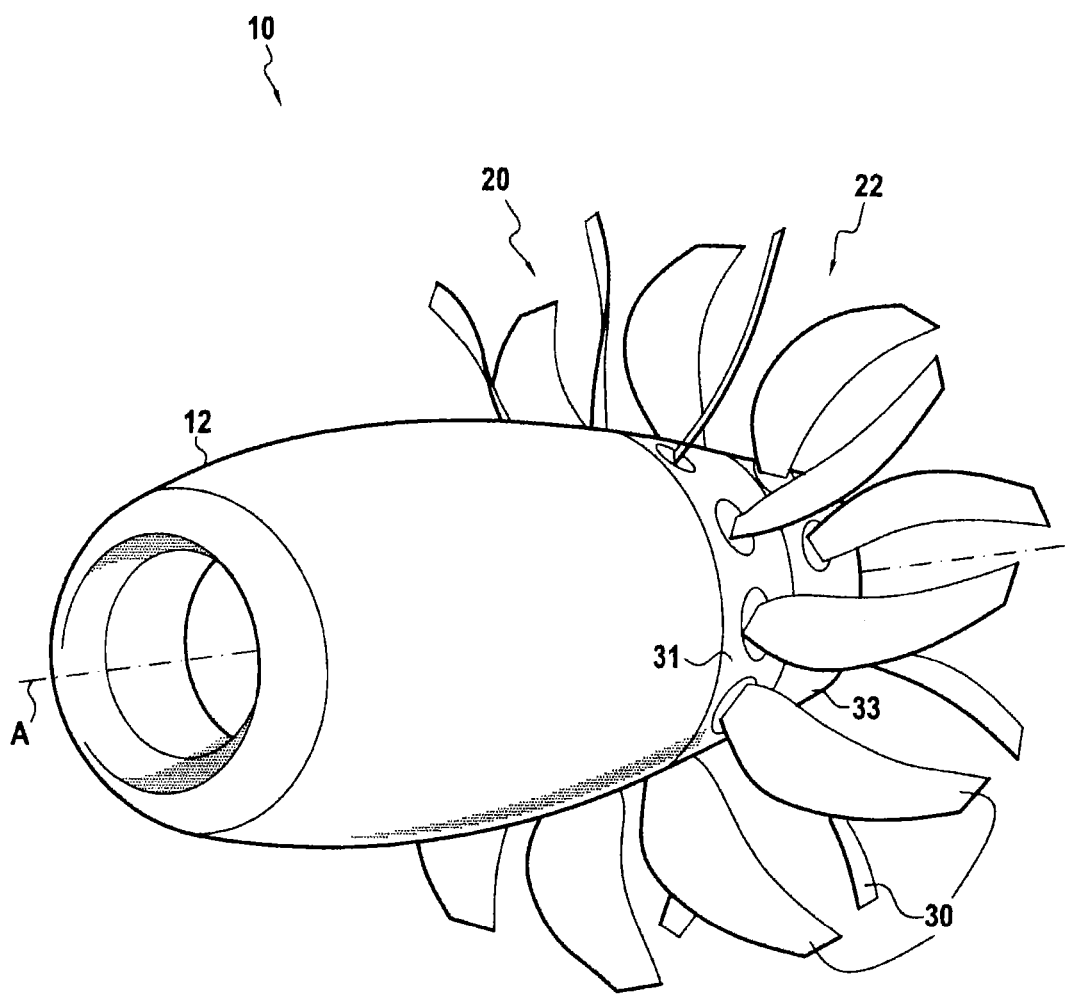
FIG. 1 is a diagrammatic overall view of a turbine engine of the invention.

With reference to FIG. 1, a turbine engine of the invention is described below.

The turbine engine 10 shown in FIG. 1 comprises a nacelle 12 together with two rotors 20 and 22 designed to rotate about an axis of rotation A of the turbine engine 10.

Each of these rotors 20 and 22 has a plurality of pivotally-mounted blades 30 that are fastened respectively on structures or casings 31 and 33 of the rotors 20 and 22. The blades 30 are thus arranged in two rows of blades, placed one behind the other in the travel direction of the engine, and designed to rotate in opposite directions, in contrarotating manner.

Each of the pivotally-mounted blades 30 is a blade that extends radially relative to the axis of rotation A of the turbine engine 10, referred to as the axis of the turbine engine. The radially outer ends of all of the blades 30 are free. Each blade 30 is capable of pivoting about its axis in order to modify its interaction with the stream of air that passes over the turbine engine 10 along the general direction of the axis A.

The blades 30 are all identical and they are arranged in angular positions that are regularly distributed around the periphery of the rotor.

Below, the arrangement of only one of the rotors 20 or 22 is described, the arrangement of the other one of the rotors being similar.

The turbine engine 10 includes a control device for controlling the angular position or "pitch" of the blades 30. The control device comprises an actuator ring 40 arranged in the rotor (FIG. 2). This actuator ring 40 is controlled in known manner by control and actuation means (not shown). The ring 40 is capable of turning about the axis A in order to transmit an angular position (or pitch) command to the blades 30.

The actuator ring 40 is generally annular in shape and is arranged in such a manner that its axis coincides with the axis A of the rotor. A set of racks 50 is mounted on the outside surface 42 of the actuator ring, there being one rack 50 facing each blade 30 of angular position that is to be controlled. The racks 50 serve to transmit the turning command from the actuator ring to the blades 30.

Each blade 30 is fastened to the structure of the rotor by a blade attachment-and-pivot device 32. Each blade attachment-and-pivot device 32 is fastened to the structure 31 of the rotor via at least one bearing (not shown) that enables the blade to pivot about its axis B.

Each blade attachment-and-pivot device 32 includes a pitch plate 35 substantially in the form of a disk of axis B, with a portion of the periphery thereof being occupied by a set of teeth 34. The plate 35 has a slot for receiving and fastening the root of the blade 30 by engagement of complementary shapes. The set of teeth 34 is positioned on the periphery of the plate 35 in such a manner that in the middle angular position of the blade, the point of contact between the plate 35 and the rack 50 lies towards the front of the turbine engine, along its axis A.

Furthermore, each rack 50 is substantially in the shape of a portion of a ring or circular arc about the axis A of the turbine engine.

Each rack 50 has a set of teeth 52 extending on a surface of the rack that faces towards the rear of the turbine engine. The respective sets of teeth 34 and 52 of the blade attachment-and-pivot device 32 and of the rack 50 face each and are arranged in such a manner as to mesh together in the manner of bevel gears. Thus, turning the actuator ring 40 about the axis A causes the blades 30 to turn about their radial axes B.

The racks 50 are mounted on the actuator ring in such a manner as to leave the racks with only one degree of freedom relative to the actuator ring (i.e. the other five degrees of freedom are blocked). The sole degree of freedom that is indeed free (over a certain range of movement) is the radial position of the rack 50 relative to the actuator ring 40.

The arrangement whereby the racks 50 are assembled on the actuator ring 40 is at the core of the invention and is described below in greater detail, with reference to FIGS. 3 to 7.

Figure 3:
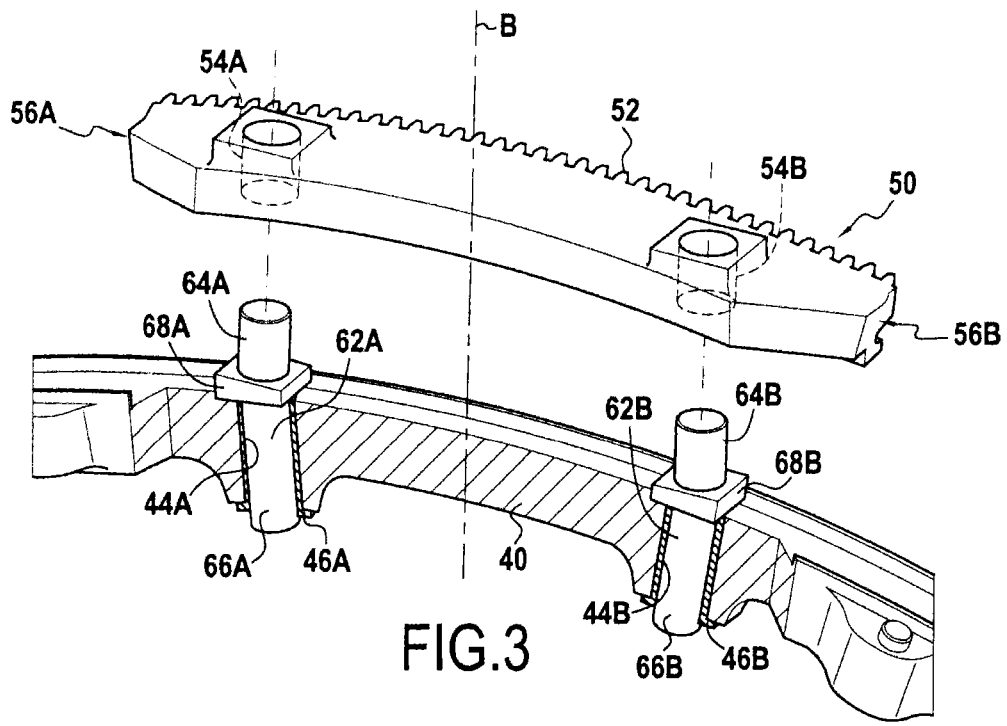
FIG. 3 is an exploded view, partially in perspective, of the FIG. 2 control device.

FIG. 3 is an exploded view showing various elements of the control device. There can thus be seen:

a rack 50 with its set of teeth 52;

the actuator ring 40 (locally cut away, shown in section); and two guides 62A and 62B.

Each of the guides 62A and 62B has a segment guide rod (64A, 64B) and a ring guide rod (66A, 66B); each segment guide rod is fastened to the ring guide rod via a junction portion (68A, 68B) in the form of a cube.

The segment guide rods 64A, 64B are in the shape of rectilinear bars, and they extend in a radial direction B. This radial direction B is the radial direction at the mid point of the rack 50 and is the radial direction at the pivot point of the blade 30.

The rack 50 has two segment guide passages 54A, 54B passing through the rack in the direction B so as to allow the segment guide rods 64A and 64B to pass therethrough. The passages 54A, 54B are situated close to the two ends 56A, 56B of the rack 50 in the circumferential direction. The rack 50 is arranged to allow the segment guide rods 64A, 64B to slide easily inside the passages 54A, 54B. To facilitate such sliding, the passages 54A, 54B have segment guide bearings 55A, 55B in the form of cylindrical sleeves made of a material having a low coefficient of friction (<0.15), or they are coated in such a material.

Together with the passages 54A, 54B, the segment guide rods 64A, 64B allow the rack 50 to move relative to the actuator ring 40 along the direction B, which is substantially radial and common to both guides (the guides 62A and 62B). In the embodiment shown, the direction B is the radial direction at the pivot point of the blade 30.

Furthermore, each of the guides 62A, 62B has a ring guide rod 66A, 66B. These rods are in the form of rectilinear bars arranged in radial passages 44A, 44B (ring guide passages) formed in the ring 40. Each of these radial passages 44A, 44B extends in a direction that is radial at the point where it is located. The radial passages 44A, 44B are arranged to enable the ring guide rods 66A, 66B to slide relative to the actuator ring in their respective radial directions. In order to facilitate this sliding, ring guide bearings 46A, 46B are arranged inside the radial passages 44A, 44B. In the embodiment shown, these bearings are merely cylindrical sleeves made of a material having a low coefficient of friction (<0.15), or they are coated in such a material.

In order to ensure they keep themselves in radial position, these bearings have respective outwardly-projecting collars arranged at the radially inner ends of the passages 44A, 44B. Each of these collars is of a diameter that is too great to be able to pass along the passages, thereby preventing any radially-outward movement of the bearings 46A, 46B during rotation of the rotor, under the effect of centrifugal forces.

In another embodiment, the ring guide bearings may be made in the form of ball cages.

Furthermore, in order to avoid impacts and in order to reduce stresses when the guides are blocked in abutment during sliding relative either to the racks or to the ring, radial abutment damper systems may be provided on the ring and/or segment guide bearings.

Finally, the segment or ring guide bearings 55A, 55B or 46A, 46B may be prevented from turning so that they do not turn about their own axes. This may be obtained by providing a flat on the circumference of each bearing, which flat becomes blocked against a corresponding flat arranged in the passage housing the bearing. The above-mentioned collars may also be provided with flats.

In association with the ring guide rods 66A, 66B, the ring guide passages 44A, 44B allow the guides 62A, 62B to move relative to the ring, each along the respective radial direction that corresponds thereto, in the event of the actuator ring 40 as a whole expanding.

FIGS. 4 and 5 show by way of comparison relative movement between the rack 50 and the guides 62A and 62B. In the first situation (FIG. 4) the rotor is turning at moderate speed. In the second situation (FIG. 5), the rotor is turning at full speed. In this situation, centrifugal forces give rise to a large outward radial movement of the blade pivot, and consequently of the rack that is linked thereto (by means that are described below).

In contrast, the actuator ring 40 deforms little relative to the structure of the rotor under the effect of centrifugal forces. Relative movement in the radial direction therefore takes place between the actuator ring, and the blade together with the blade pivot that are linked to the rack.

This relative movement can be seen in FIG. 5. Under the effect of rotation, the rack 50 is caused to move away from the axis of rotation since its radial movement is linked to the radial movement of the blade by radial positioning means fastened to the blade; the rack is thus shown higher up in FIG. 5 than in FIG. 4. In contrast, it can be seen that the position of the actuator ring 40 relative to the guides 62A and 62B has not changed.

Also by way of comparison, FIGS. 4 and 6 show a relative movement between the rack 50 and the guides 62A and 62B in another situation in which the rotor 20 is stressed. In the first situation (FIG. 4) the rotor is rotating at moderate speed, as mentioned above. In the second situation (FIG. 6), the rotor is stationary. When stationary, the actuator ring 40 shrinks radially relative to the position that it takes up (or the volume that it occupies) while it is in rotation, since it is no longer subjected to centrifugal forces. The actuator ring 40 is thus shown lower down in FIG. 6 than in FIG. 4 relative to the guides 62A and 62B. In contrast, it can be seen that the relative positions of the rack 50 and the guides 62A and 62B have not changed.

It will naturally be understood that the above two comparisons are relatively theoretical special cases that are described in order to show the two kinds of relative movement that can take place between the guides and the ring and/or the rack. In practice, while the rotor is in operation, both effects (expansion of the entire actuator ring 40; radial separation of the blade pivot and thus of the rack 50) take place generally jointly to a greater or local extent depending on the speed of rotation, the temperature, the materials of the various components, etc.

FIG. 7 shows the shape of the junction portion 68A, 68B of the guides 62A, 62B. During assembly of the rotor, the guides 62A, 62B are mounted on the actuator ring, and then the racks 50 are mounted on the guides.

The ring guide rods 64A, 64B make an angle relative to the segment guide rods 66A, 66B. This angle is the angle that is formed between the radial direction for the guides and the radial direction at the blade pivot point (direction B).

In order to facilitate assembly of the racks on the guides, the guides are prevented from turning about the axes of the ring guide rods 66A, 66B. This is achieved by the junction portion 68A, 68B. It is substantially in the form of a rectangular block. In particular, it presents two parallel plane surfaces referred to as front and rear surfaces 67A, 67B and 69A, 69B for the junction portions 68A and 68B, respectively, with the normals to those surfaces being directed respectively towards the front and towards the rear of the turbine engine.

A groove 45 is formed in the radially outer surface 42 of the actuator ring 40. This groove 45 has two side surfaces 47 and 49 facing respectively towards the rear and towards the front of the turbine engine. The width of the groove 45 is more or less equal to (very slightly greater than) the distance between the front and rear surfaces 67A, 67B and 69A, 69B of the junction portions 68A, 68B. Thus, when the guides 62A, 62B are mounted on the actuator ring, the junction portions 68A, 68B are prevented from turning between the side faces 47 and 49 of the groove 45.

FIG. 8 shows the radial positioning means provided for the racks 50.

The right-hand portion of FIG. 8 shows in particular the blade attachment-and-pivot device 32 and the set of teeth 34 formed on the pitch plate 35. The radial positioning means mainly comprise a circularly arcuate rib 70 about the radial axis B and arranged on a separate end plate fastened to and incorporated in the blade attachment-and-pivot device 32. The rib 70 is engaged in a groove 72 in the rack 50 meshing with the blade 30. Because the rib 70 is engaged in the groove 72, radial movements of the blade root 32 are transmitted to the rack 50. In this way, the rib 70 determines a radial position for the rack 50, i.e. a position along the axis B of the blade, that is independent of the radial position of the actuator ring 40.

The radial movements of the rack 50 relative to the actuator ring give rise merely to the segment guide rods 64A, 64B sliding in the segment guide passages 54A, 54B independently of linked movements of the ring and of the rack in the circumferential direction.

The invention claimed is:

1. An assembly comprising:
an actuator ring;
a plurality of pivotally-mounted blades distributed in azimuth around a first axis;
a control device controlling angular position of the plurality of pivotally-mounted blades by the actuator ring;
each of the blades presenting a set of teeth;
racks mounted on the ring;
wherein each rack meshes with the set of teeth of one of the blades to place the blade in a selected angular position;
each rack is held in the radial direction by radial positioning means fastened to the blade;

each rack is mounted on the ring by a plurality of guides spaced around the circumference of the ring, linking movements of the rack in the circumferential direction to movements of the ring, and configured to slide firstly relative to the ring along the radial direction specific to each guide, and secondly relative to the rack along a movement direction that is substantially radial and specific to the rack.

2. An assembly according to claim 1, wherein the movement direction of each rack is parallel to an axis of the blade having its set of teeth meshing with the rack.

3. An assembly according to claim 1, wherein at least one of the guides includes a ring guide rod engaged slidably in a ring guide passage formed in the ring in a direction that is radial for the guide.

4. An assembly according to claim 1, wherein at least one of the guides includes a segment guide rod engaged slidably in a segment guide passage arranged in the movement direction of the rack under consideration.

5. An assembly according to claim 4, wherein at least one of the guides includes a ring guide rod engaged slidably in a ring guide passage formed in the ring in a direction that is radial for the guide, and wherein at least one guide is a part constituted by the ring guide rod, the segment guide rod, and a junction portion connecting together the ring and segment guide rod.

6. An assembly according to claim 1, further comprising turn-blocking means arranged on the ring and for preventing at least a first guide from turning relative to the ring about a radial direction.

7. An assembly according to claim 6, wherein the first guide presents a flat perpendicular to the first axis, and the ring presents a plane surface arranged in proximity of the flat so as to prevent the guide from turning about a radial direction.

8. An assembly according to claim 1, wherein at least one of the guides includes a ring guide rod engaged slidably in a ring guide passage formed in the ring in a direction that is radial for the guide, the assembly including at least one guide bearing or a ball cage arranged in one of the passages to ensure that the rod extending in the passage slides therein.

9. An assembly according to claim 8, further comprising a damper system in radial abutment against the bearing.

10. An assembly according to claim 1, wherein at least one of the guides includes a segment guide rod engaged slidably in a segment guide passage arranged in the movement direction of the rack under consideration, the assembly including at least one guide bearing or a ball cage arranged in one of the passages to ensure that the rod extending in the passage slides therein.

11. An assembly according to claim 1, wherein the radial positioning means for each blade comprises a circularly arcuate rib about a radial axis arranged in an attachment-and-pivot device for the blade, and engaged in a groove of the rack meshing with the blade to impose a radial position on the rack.

12. An assembly according to claim 1, wherein the movement direction of each rack is parallel to an axis of the blade having its set of teeth meshing with the rack, and wherein at least one of the guides includes a ring guide rod engaged slidably in a ring guide passage formed in the ring in a direction that is radial for the guide.

13. A turbine engine comprising an assembly according to claim 1.

14. A turbine engine according to claim 13, wherein the blades controlled by the control device are blades having radially outer ends that are free.

* * * * *